United States Patent [19]

Gotzmer, Jr. et al.

[11] 4,168,362

[45] Sep. 18, 1979

[54] NON-MIGRATING FERROCENE CONTAINING SOLID PROPELLANT BINDER

[75] Inventors: Carl Gotzmer, Jr., Clinton, Md.; Manfred J. Cziesla, Fairfax, Va.

[73] Assignee: The United States of America as represented by the Secretary of the Navy, Washington, D.C.

[21] Appl. No.: 863,299

[22] Filed: Dec. 14, 1977

Related U.S. Application Data

[63] Continuation-in-part of Ser. No. 528,195, Nov. 25, 1974, abandoned.

[51] Int. Cl.$^2$ ............................................. C06B 45/10
[52] U.S. Cl. .................... 528/75; 149/19.2; 149/19.4; 149/19.9; 260/439 CY
[58] Field of Search ................ 260/439 CY; 149/19.2, 149/19.4, 19.9; 528/75

[56] References Cited

U.S. PATENT DOCUMENTS

| | | | |
|---|---|---|---|
| 3,245,849 | 4/1966 | Klager et al. | 149/19.4 |
| 3,305,523 | 2/1967 | Burnside | 149/19.4 |
| 3,415,764 | 12/1968 | Erikson | 149/19.1 |
| 3,770,786 | 11/1973 | Huskins et al. | 149/19.2 |
| 3,898,254 | 8/1975 | Combs et al. | 149/19.2 |
| 3,932,240 | 1/1976 | Brown et al. | 149/19.2 |

OTHER PUBLICATIONS

Knox et al., J. Chem. Soc. C, 1967(19), 1842–1847.
Knox et al., J. Chem. Soc., 1958, 692–696.
Hodgman, "Handbook of Chemistry and Physics," 38th Ed., 678–679, Chemical Rubber Publishing Co. (1956), Cleveland.
Chem. Abs., 1967–1971, Formula Index, p. 4011f.

*Primary Examiner*—Edward A. Miller
*Attorney, Agent, or Firm*—R. S. Sciascia; A. L. Branning; H. B. Field

[57] ABSTRACT

A ferrocenyl thiol compound is reacted with an unsaturated prepolymer to form a polymeric material suitable for use as a binder in composite propellant.

12 Claims, No Drawings

NON-MIGRATING FERROCENE CONTAINING SOLID PROPELLANT BINDER

CROSS-REFERENCE TO RELATED APPLICATIONS

This application is a continuation-in-part of copending application Ser. No. 528,195, filed Nov. 25, 1974, and now abandoned.

BACKGROUND OF THE INVENTION

This invention relates to composite propellants and more particularly to composite propellants having additives which do not migrate.

Numerous additives are used in solid rocket propellants to improve their burning rate, stability, sensitivity, and mechanical properties. Often the greatest influence on these factors are shown by low molecular weight materials which unfortunately cannot be used because their volatility results in partial or complete evaporation during curing or long term storage. Even if the vapor pressure of conventional additives is low enough, their migration within the propellant matrix often cannot be prevented, and "bleeding-out" of the additives and deterioration of the propellant's properties occur; e.g., compounds such as Hycat 6 and other alkyl ferrocenes increase the burning rate of propellants and have low vapor pressure but cannot be used as additives because they migrate to the surface of the solid propellant. Such migration causes increased sensitivity and erratic burning.

Ferrocene compounds increase the shock sensitivity of propellants. Migration to the surface of the propellant by the ferrocene causes the surface of the propellant to be even more shock sensitive than the average propellant would be before migration took place. Migration further destroys propellant homogeneity and permits higher burning rates on the surface of the propellant than throughout the remainder of the propellant, which is undesirable due to the unpredictability of the burning rate which in turn renders the rocket performance unpredictable.

The term Hycat 6 refers to an alkyl ferrocene compound available from Arapahoe Company of Boulder, Colo., a division of Syntex Company.

Many of the solutions proposed in the past do not solve the problem of additive migration. Other additives designed to reduce migration produce other problems, without solving the migration problem completely. With special attention directed to the ferrocenyl compounds as burning rate additives, several problems are generated. Ferrocenyl compounds are well-known burning rate additives. Low molecular weight ferrocene compounds vaporize out of the propellant. High molecular weight liquid ferrocene compounds also migrate to the surface of the propellant destroying the homogeneity of the propellant. Solid ferrocene compounds often sublime out of the solid propellant. Thus it is difficult to use ferrocene compounds as burning rate modifiers.

Accordingly, it would be desirable to provide a stable additive for use in propellants which will not compromise other desired properties of the propellant. Such an additive would be required to have a certain stability which is imparted to the propellant to which it is added.

SUMMARY OF THE INVENTION

It is therefore, an object of this invention to provide a stable rocket propellant.

Also, it is an object of this invention to provide a rocket propellant having a uniform sensitivity throughout the matrix.

It is a further object of this invention to provide a propellant having stable burning characteristics.

It is a still further object of this invention to provide a non-migrating propellant additive.

Also it is an object of this invention to provide a method for making stable propellant additive.

Another object of this invention is to provide a method for preventing migration of ferrocene compounds as used in a propellant.

Yet another object is to provide a propellant additive which increases the burning rate of the propellant.

These and other object are met by providing a propellant having a high burning rate due to the incorporation of a burning rate modifier into the binder via a chemical reaction.

DESCRIPTION OF THE PREFERRED EMBODIMENTS

A propellant having an additive chemically bonded to the binder of the propellant is characterized by a high burning rate when the additive is a non-migrating burning rate modifier. A propellant additive such as those disclosed hereinbelow, when bonded to the binder imparts stability to the propellant due to the presence of the C-S-C chemical bond between the binder and the burning rate modifier.

Suitable unsaturated binders include polybutadienes such as hydroxyl terminated polybutadiene and copolymers of butadiene and olefines such as acrylic acid, acrylonitrile and vinyl acetate. Another suitable family of binders are unsaturated polyesters derived from diols such as glycol and propyleneglycol, and maleic acid or mixtures of dicraboxylic and maleic acid. These and other typical binders are well-known in the art as evidenced by U.S. Pat. No. 3,141,294 to Lawrence et al; and U.S. Pat. No. 3,607,471 to Osborn; both of said patents binder is disclosed in U.S. patent application No. 453,661 filed Mar. 21, 1974 incorporated herein by reference.

To accomplish the purpose of this invention, propellant additives known generically as thiols, and containing one or more mercaptan groups, are bonded to an unsaturated propellant binder through its double bond. Typical compounds reacted with the binder include 2-ferrocenyl ethanethiol and other ferrocenyl thiol compounds. Other typical ferrocene compounds include ferrocene thiol; 2,2,-diferrocenyl hexanethiol, ferrocenyl thioacetic acid; and 2,2-diferrocenyl hexanethoic acid. Other thiols suitable for use in this invention are in U.S. Pat. No. 3,278,352 to Erickson incorporated herein by reference.

The aforementioned ferrocenyl thiols can now be prepared in their pure form by a two step reaction. First one prepares a thioester by reacting the desired ferrocene and thioacetic acid in the presence of a free radical initiator such as 2,2'-azobis(2-methyl propionitrile) at elevated temperatures. Then, the thioester is hydrolyzed to obtain the desired ferrocenyl thiol. Specifically, 2-ferrocenyl ethanethiol is produced by first reacting vinyl ferrocene and thioacetic acid in the presence of 2,2-'azobis(2-methyl-propionitrile). The product of this reaction, 1-ferrocenyl-2-thioacetoxy ethane is then hydrolyzed with sodium ethylate in ethanol to yield the desired product.

The reaction between the prepolymer and the thiol to form the binder is carried out in any suitable fashion. The binder is then incorporated into a propellant. A possible point of reaction between the prepolymer and the thiol is at the mercaptan (SH) group and the carbon-carbon double bond of the prepolymer.

In the following examples, which are intended only for the purpose of illustrating without unduly limiting the invention, all parts and percentages are by weight unless otherwise specified.

EXAMPLE I

This example is directed to the preparation of the binder. About 72 grams of 2-Ferrocenyl ethanethiol, 72 grams of R45M polymer (which is a hydroxyl terminated polybutadiene polymer having a molecular weight of 3,300 and a functionality of 2.6 available from Arco Inc.) 12 grams of 2,2'-azobis(2-methyl propiontrile) are placed in a flask and allowed to react for three hours at 85° C. under nitrogen purging in benzene solution. The reaction mixture is evaporated to dryness, treated with 1000 ml of heptane filtered through silica gel, evaporated to dryness again, dissolved in benzene and precipitated into 2000 ml of acetone. A total of three precipitations into acetone are performed. Each 2000 ml of acetone extract is saved. The remaining polymer fraction was designated Fc-polymer I (41 grams, containing 1.92% iron). The acetone extracts are added together, evaporated to dryness, dissolved in benzene and precipitated into 2000 ml of ethanol. A total of three precipitations were carried out. The remaining polymer fraction is dried and designated Fc-polymer II (20 grams, 5.11% Fe). Reaction of the -SH through the double bond of the binder permits incorporation of the ferrocene throughout the polymer.

EXAMPLE II

This example is directed to the use of the binder of Example I in a propellant and a comparison thereof to a prior art propellant as to migration properties and propellant capabilities.

Two ferrocene-polymer gumstocks (X and Y) are formulated, cured and extracted for 24 hours with refluxing methylene chloride. Gumstock X is prepared using a ferrocene additive (Hycat 6), R45M polymer, HDI (hexane diisocyanate) and FeAA as catalyst (iron acetyl acetonate catalyst).

Gumstock Y is prepared using the synthesized Fc-polymer I as a substitute for Hycat 6 and R45M. The gumstocks are formulated to contain the identical iron content and were cured and extracted by identical procedures. After 24 hours of extraction with methylene chloride, 100% of the iron is found to be removed from gumstock X, as compared with 2.4% iron removed from gumstock Y. The theoretical amount of iron that can be attributed to the FeAA catalyst is 0.7% iron in each gumstock.

Thus the binder made by the method of Example I suffers no migration problems.

Standard tests summarized in the following table illustrate that propellant performance is not substantially affected.

TABLE I

Summary of Propellants Using Ferrocene Containing R45M Binders

| Binder Composition | Burning Rate, in/sec., 1000 psia, 77° F. | Impact Test 5 kg. wt. | Sliding Friction ft/sec |
|---|---|---|---|
| a. R45M | 0.221 | 125 mm | 720 lbs. |
| b. R45M, Fc-Polymer I (equivalent in iron to 1% Hycat 6) | 0.407 | 150 mm | 960 lbs. |
| c. R45M, Fc-Polymer II (equivalent in iron to 2% Hycat 6) | 0.489 | 150 mm | 540 lbs. |
| d. R45M, Fc-Polymer II (equivalent in iron to 3% Hycat 6) | 0.543 | 125 mm | 540 lbs. |
| e. R45M, with 2% Hycat 6 | 0.471 | 125 mm | 540 lbs. |

None of the propellants ignited in the electrostatic discharge test (12.5 joules, 5000 volts).

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A polymeric material capable of being cured to form a composite propellant binder wherein the polymeric material comprises the reaction product of
   (1) an unsaturated prepolymer selected from the group consisting of hydroxyl-terminated polybutadienes, and copolymers of butadiene with an olefin selected from the group consisting of acrylic acid, acrylonitrile, and vinyl acetate,
   (2) a ferrocenyl thiol of the formula

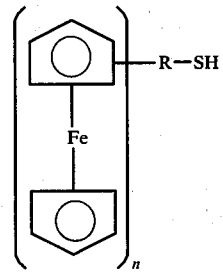

wherein R is selected from the group consisting of —CH$_2$CH$_2$—,

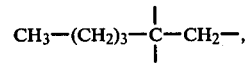

and a valence bond, and n is 1 when R is —CH$_2$CH$_2$— or a valence bond, but n is 2 when R is

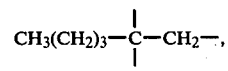

and (3) a free radical initiator.

2. The polymeric material of claim 1 wherein the ferrocenyl thiol is 2-ferrocenyl ethanethiol.

3. The polymeric material of claim 1 wherein the thiol is 2,2-diferrocenyl hexanethiol.

4. The polymeric material of claim 1 wherein the thiol is ferrocene thiol.

5. A composite propellant binder which is the reaction product of the polymeric material of claim 1 and a curing agent.

6. A composite propellant binder according to claim 5 wherein the curing agent is a conventional diisocyanate and the polymeric material is made from hydroxyl-terminated polybutadiene.

7. A composite propellant binder which is the reaction product of the polymeric material of claim 2 and a curing agent.

8. A composite propellant binder according to claim 7 wherein the curing agent is a conventional diisocyanate and the polymeric material is made from a hydroxyl-terminated polybutadiene.

9. A composite propellant binder which is the reaction product of the polymeric material of claim 3 and a curing agent.

10. A composite propellant binder according to claim 9 wherein the curing agent is a conventional diisocyanate and the polymeric material was made from hydroxyl-terminated polybutadiene.

11. A composite propellant binder which is the reaction product of the polymeric material of claim 4 and a curing agent.

12. A composite propellant binder according to claim 11 wherein the curing agent is a conventional diisocyanate and the polymeric material was made from a hydroxyl-terminated polybutadiene.

* * * * *